(12) United States Patent
Gao et al.

(10) Patent No.: US 10,854,128 B2
(45) Date of Patent: Dec. 1, 2020

(54) DISPLAY PANEL HAVING VIRTUAL DRIVING UNITS AND DISPLAY DEVICE

(71) Applicant: WuHan TianMa Micro-Electronics Co., Ltd., Wuhan (CN)

(72) Inventors: Yana Gao, Wuhan (CN); Xinzhao Liu, Wuhan (CN); Yue Li, Wuhan (CN); Xingyao Zhou, Wuhan (CN); Kaihong Huang, Wuhan (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 16/257,105

(22) Filed: Jan. 25, 2019

(65) Prior Publication Data

US 2020/0126470 A1    Apr. 23, 2020

(30) Foreign Application Priority Data

Oct. 18, 2018    (CN) .......................... 2018 1 1214530

(51) Int. Cl.
  *G09G 3/20*    (2006.01)
(52) U.S. Cl.
  CPC ... *G09G 3/2085* (2013.01); *G09G 2300/0426* (2013.01); *G09G 2310/08* (2013.01)

(58) Field of Classification Search
  CPC ... G09G 2310/0267; G09G 2310/0286; G09G 3/3266; G09G 3/3677
  See application file for complete search history.

(56) References Cited

U.S. PATENT DOCUMENTS

| | | | |
|---|---|---|---|
| 2014/0079176 A1* | 3/2014 | Qian | G11C 19/28 377/77 |
| 2017/0116923 A1* | 4/2017 | Bae | G11C 19/287 |
| 2018/0075810 A1* | 3/2018 | Kim | G09G 3/3266 |
| 2018/0122298 A1* | 5/2018 | Lee | H01L 27/1225 |

* cited by examiner

*Primary Examiner* — Yuzhen Shen
(74) *Attorney, Agent, or Firm* — Tarolli, Sundheim, Covell & Tummino LLP

(57) ABSTRACT

The present disclosure provides a display panel including: gate lines; data lines insulated from and intersecting with gate lines; pixel units; first and second clock signal lines; first and second power signal lines; gate driving units; and virtual driving units. Each gate driving unit has an output terminal electrically connected to gate lines, a first clock signal input terminal electrically connected to first clock signal line, and a second clock signal input terminal electrically connected to second clock signal line. Each virtual driving unit has an output terminal insulated from gate lines, a first clock signal input terminal insulated from first and second clock signal lines, and a second clock signal input terminal insulated from first and second clock signal lines. At least one virtual driving unit is disposed within the rounded angle region and located between two gate driving units.

18 Claims, 15 Drawing Sheets

DISPLAY PANEL HAVING VIRTUAL DRIVING UNITS AND DISPLAY DEVICE

CROSS-REFERENCE TO RELATED APPLICATIONS

The present application claims priority to Chinese Patent Application No. 201811214530.0, filed on Oct. 18, 2018, the content of which is incorporated herein by reference in its entirety.

TECHNICAL FIELD

The present disclosure relates to the field of display technologies, and in particular, to a display panel and a display device.

BACKGROUND

With the application of the display technologies in intelligent electronic devices, wearable electronic devices and other portable electronic devices, design of electronic products is constantly pursuing user-friendly experience as well as user's sensual experience. For example, a wide viewing angle, a high resolution, a narrow border, a high screen occupancy ratio and the like properties have become selling points of various electronic products.

In order to further improve the screen occupancy ratio, the existing electronic products have continuously improved utilization of space around the camera and the earpiece, and various design schemes such as "notch screen", "non-rectangular screen", and "hole screen" have appeared. In this way, a lot of rounded angle regions appear on the display screen, which may affect arrangement of gate driving units and may also affect etching uniformity, thereby resulting in electrostatic damage, film breakage or even disjuncture, and encapsulation failure occurring in the rounded angle regions.

SUMMARY

The present disclosure provides a display panel and a display device, aiming to solve the above problem caused by etching non-uniformity in a rounded angle region by providing a virtual driving unit similar to a gate driving unit.

In an aspect, the present disclosure provides a display panel. The display panel has a display region and a peripheral region. The display panel includes: a plurality of gate lines; a plurality of data lines, the plurality of data lines being insulated from and intersecting with the plurality of gate lines; a plurality of pixel units; a first clock signal line; a second clock signal line; a first power signal line; a second power signal line; a plurality of gate driving units; and a plurality of virtual driving units. Each of the plurality of gate driving units has an output terminal electrically connected to one of the plurality of gate lines, a first clock signal input terminal electrically connected to the first clock signal line, and a second clock signal input terminal electrically connected to the second clock signal line. Each of the plurality of virtual driving units has an output terminal insulated from the plurality of gate lines, a first clock signal input terminal insulated from the first clock signal line and the second clock signal line, and a second clock signal input terminal insulated from the first clock signal line and the second clock signal line. The peripheral region includes at least one rounded angle region, and at least one of the plurality of virtual driving units is disposed within the rounded angle region and located between two of the plurality of gate driving units.

In another aspect, the present disclosure provides a display device including the abovementioned display panel.

BRIEF DESCRIPTION OF DRAWINGS

In order to illustrate technical solutions in embodiments of the present disclosure or in the related art, the accompanying drawings used in the embodiments and in the related art are introduced as follows. These drawings merely illustrate some embodiments of the present disclosure. On the basis of these drawings, those skilled in the art can also obtain other drawings without paying any creative effort.

DESCRIPTION OF EMBODIMENTS

Figure 1A:
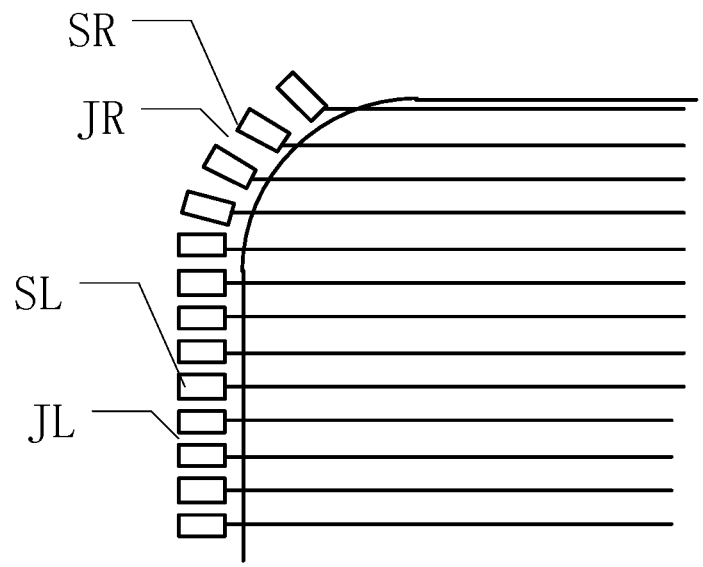
FIG. 1A is a schematic diagram illustrating an arrangement of gate driving units in a rounded angle region commonly used in the related art.

In order to clarify the purpose, technical solutions, and advantages of the embodiments of the present disclosure, the technical solutions in the embodiments of the present disclosure will be described in the following with reference to the accompanying drawings. It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that, the term "and/or" is used in the present disclosure merely to describe relations between associated objects, and thus includes three types of relations. That is, A and/or B can represent: (a) A exists alone; (b) A and B exist at the same time; or (c) B exists alone. In addition, the character "/" generally indicates "or".

It should be understood that although terms "first", "second", "third" etc. are used to describe clock signal lines, power signal lines, gate driving transistors, gate driving capacitors, virtual driving transistors, virtual driving capacitors, clock signal input terminals, and power signal input terminals, they shall not be interpreted as limiting the specific clock signal lines, power signal lines, gate driving transistors, gate driving capacitors, virtual driving transistors, virtual driving capacitors, clock signal input terminals, and power signal input terminals. These terms are merely used to distinguish the clock signal lines, power signal lines, gate driving transistors, gate driving capacitors, virtual driving transistors, virtual driving capacitors, clock signal input terminals and power signal input terminals from one another. For example, without departing from the scope of the embodiments of the present disclosure, a first clock signal line, a first power signal line, a first gate driving transistor, a first gate driving capacitor, a first virtual driving transistor, a first virtual driving capacitor, a first clock signal input terminal and a first power signal input terminal may also be referred to as a second clock signal line, a second power signal line, a second gate driving transistor, a second gate driving capacitor, a second virtual driving transistor, a second virtual driving capacitor, a second clock signal input terminal and second power signal input terminal, respectively. Similarly, a second clock signal line, a second power signal line, a second gate driving transistor, a second gate driving capacitor, a second virtual driving transistor, a second virtual driving capacitor, a second clock signal input terminal, and a second power signal input terminal may also be referred to as a first clock signal line, a first power signal line, a first gate driving transistor, a first gate driving capacitor, a first virtual driving transistor, a first virtual driving capacitor, a first clock signal input terminal, and a first power signal input terminal, respectively.

Figure 1B:
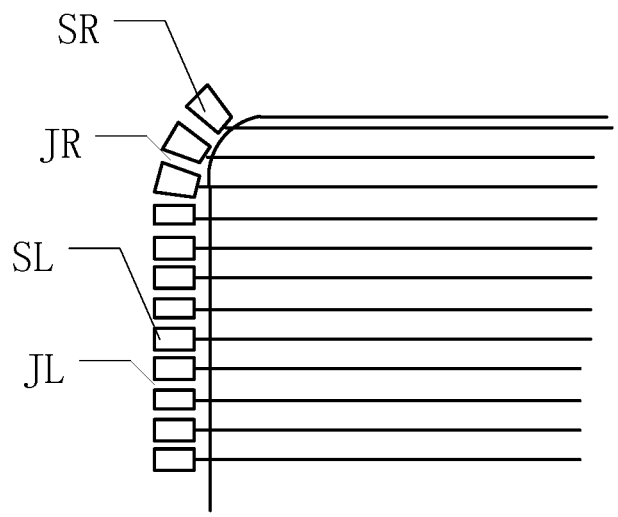
FIG. 1B is a schematic diagram illustrating another arrangement of gate driving units in a rounded angle region commonly used in the related art.

FIG. 1A and FIG. 1B are designs of gate driving units commonly used in a rounded angle region. As shown in FIG. 1A, a plurality of gate driving units SL is arranged in a non-rounded angle region, and a first gap JL is formed between two adjacent gate driving units SL in the non-rounded angle region. A plurality of gate driving units SR is arranged in a rounded angle region, and a second gap JR is formed between two adjacent gate driving units SR in the rounded angle region. As can be seen from FIG. 1A, since the number of gate driving units required for per unit length in the rounded angle region is smaller than the number of gate driving units required for per unit length in the non-rounded angle region, the second gap JR is bigger than the first gap JL. That is, the number of gate driving units per unit area in the rounded angle region is smaller than the number of gate driving units per unit area in the non-rounded angle region, i.e., there are more blank regions in the rounded angle region. In this case, the rounded angle region and the non-rounded angle region may be unevenly etched, thereby affecting the encapsulation effect. In order to fill the blank region, it is conventional to make certain changes to the gate driving unit, for example changing it into a trapezoidal shape, an irregular quadrilateral or the like, which is different from the gate driving unit in the non-rounded angle region. As shown in FIG. 1B, a plurality of gate driving units SL is arranged in the non-rounded angle region, and each of the plurality of gate driving units SL in the non-rounded angle region is formed as a rectangular shape. A plurality of gate driving units SR is arranged in the rounded angle region, and each of the plurality of gate driving units SR in the rounded angle region is formed as a non-rectangular shape and has a larger area than the gate driving unit SL in the non-rounded angle region. With such a design, although the blank regions may keep consistent, the gate driving units have a decreased uniformity, which affects the internal etching of the gate driving units as well as the subsequent encapsulation and thus has an influence on the gate driving unit device and even on the display effect.

Figure 2:
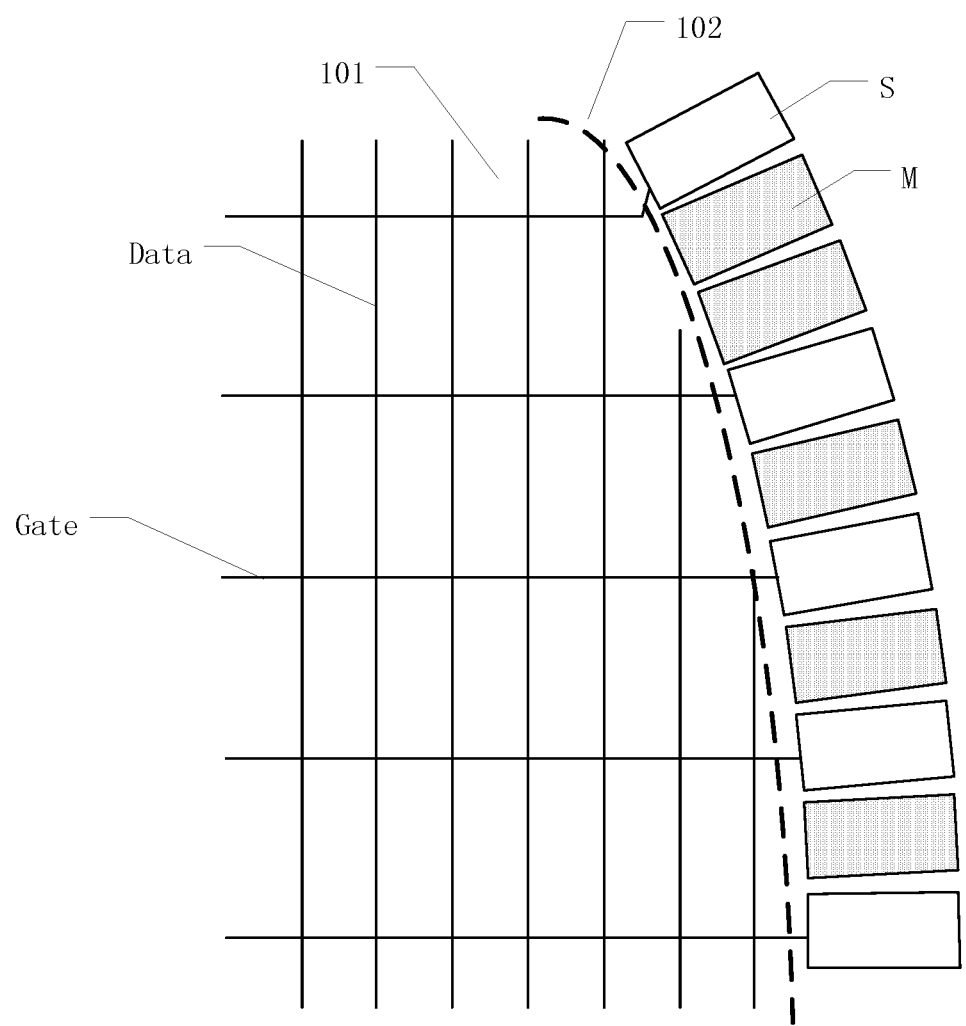
FIG. 2 is a schematic diagram illustrating an arrangement of gate driving units and virtual driving units in a rounded angle region of a display panel according to an embodiment of the present disclosure.
Figure 3:
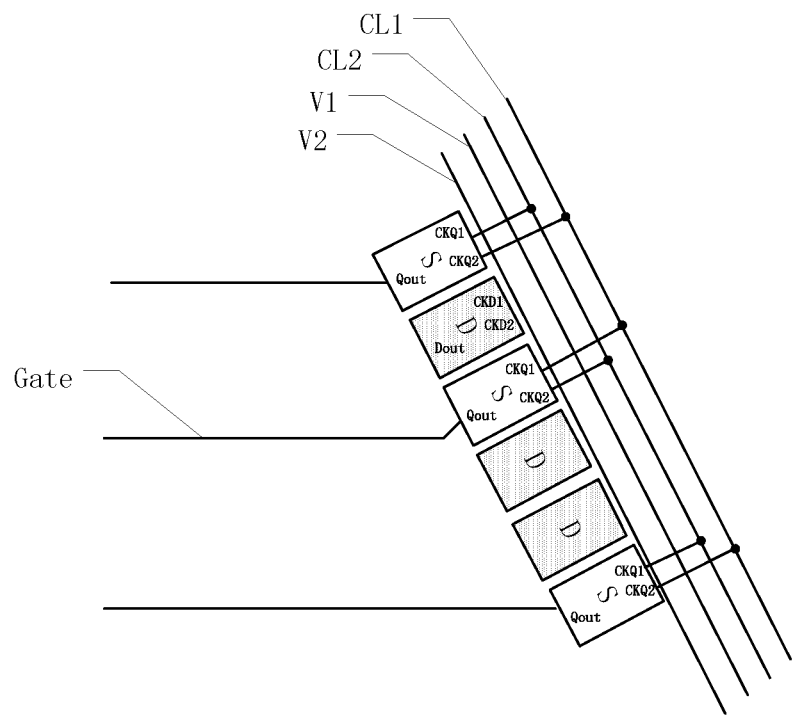
FIG. 3 is a schematic diagram illustrating an arrangement and connections of gate driving units and virtual driving units of a display panel according to an embodiment of the present disclosure.

An embodiment of the present disclosure provides a display panel 100. As shown in FIG. 2 and FIG. 3, the display panel 100 has a display region 101 and a peripheral region 102. The display panel 100 includes a plurality of gate lines Gate, a plurality of data lines Data, a plurality of pixel units P, a first clock signal line CL1, a second clock signal line CL2, a first power signal line V1, and a second power signal line V2. Herein, the plurality of data lines Data is insulated from and intersects with the plurality of gate lines Gate.

With further reference to FIG. 2 and FIG. 3, the display panel 100 further includes a plurality of gate driving units S and a plurality of virtual driving units D. Each gate driving unit S has a first clock signal input terminal CKQ1, a second clock signal input terminal CKQ2, and an output terminal Qout. The output terminal Qout of the gate driving unit S is electrically connected to the gate line Gate, the first clock signal input terminal CKQ1 of the gate driving unit S is electrically connected to the first clock signal line CL1, and the second clock signal input terminal CKQ2 of the gate driving unit S is electrically connected to the second clock signal line CL2. It should be noted that when the first clock signal input terminal CKQ1 of one stage of gate driving unit S is electrically connected to the first clock signal line CL1 and the second clock signal input terminal CKQ2 of this stage of gate driving unit S is electrically connected to the second clock signal line CL2, the first clock signal input terminal CKQ1 of a next stage of gate driving unit S is electrically connected to the second clock signal line CL2 and the second clock signal input terminal CKQ2 of the next stage of gate driving unit S is electrically connected to the first clock signal line CL1. That is, the respective first clock signal input terminals CKQ1 of the plurality of gate driving units are alternately electrically connected to the first clock signal line CL1 and the second clock signal line CL2, and the respective second clock signal input terminals CKQ2 of the plurality of gate driving units are alternately electrically connected to the first clock signal line CL1 and the second clock signal line CL2.

With further reference to FIG. 2 and FIG. 3, each virtual driving unit D has a first clock signal input terminal CKD1, a second clock signal input terminal CKD2, and an output terminal Dout. The output terminal Dout of the virtual driving unit D is insulated from the gate line Gate, and the first clock signal input terminal CKD1 and the second clock signal input terminal CKD2 of the virtual driving unit D are both insulated from the first clock signal line CL1 and the second clock signal line CL2. That is, although the virtual driving unit D has a same or similar design as the gate driving unit S, the virtual driving unit D is not connected to the gate line Gate, the first clock signal line CL1 or the second clock signal line CL2. That is, unlike the gate driving unit S, the virtual driving unit D does not have the function of driving the gate line Gate and performing signal shift. The peripheral region 102 includes at least one rounded angle region, and at least one virtual driving unit D is arranged in the rounded angle region and located between two gate driving units S.

In an embodiment, the first power signal line V1 can input a high-level signal, and the second power signal line V2 can input a low-level signal. The virtual driving unit D can have exactly the same design as the gate driving unit S, or a ratio of an area of the virtual driving unit D to an area of the gate driving unit S can be within a range of 0.99:1 to 1:0.99.

For the display panel 100 provided by this embodiment of the present disclosure, at least one virtual driving unit D, which is the same as or similar to the gate driving unit S, is arranged between the gate driving units S in the rounded angle region, such that a position without the gate driving unit S in the rounded angle region is filled, and thus the problem of uneven etching in the rounded angle region can be solved and the reliability and yield of the display panel 100 can be improved.

Figure 4:
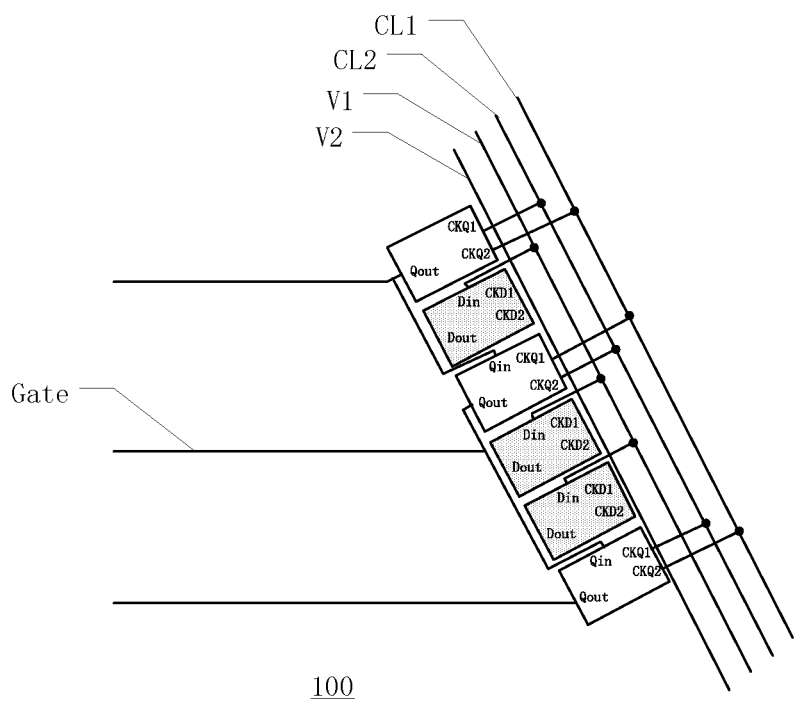
FIG. 4 is a schematic diagram illustrating an arrangement and connections of gate driving units and virtual driving units of another display panel according to an embodiment of the present disclosure.

In an embodiment, as shown in FIG. 4, an input terminal Qin of the gate driving unit S is electrically connected to the output terminal Qout of a previous stage of gate driving unit S, and a virtual signal input terminal Din of the virtual driving unit D is electrically connected to the first power signal line V1. The virtual signal input terminal Din of the virtual driving unit D is electrically connected to the first power signal line V1, so as to increase the electrostatic discharge path. Thus, the virtual driving unit D can be used as an electrostatic discharge unit, further increasing the reliability of the display panel 100.

It should be noted that, in other embodiments of the present disclosure, for example, the input terminal Qin of the gate driving unit S is electrically connected to the output terminal Qout of a previous stage of gate driving unit S, and the virtual signal input terminal Din of the virtual driving unit D is floating. That is, the virtual signal input terminal Din of the virtual driving unit D is not electrically connected to any signal line and does not access any signal. Floating the virtual signal input terminal Din of the virtual driving unit D can simplify the trace design and avoid an impact of a cross-bridge design on other signal lines.

Figure 5:
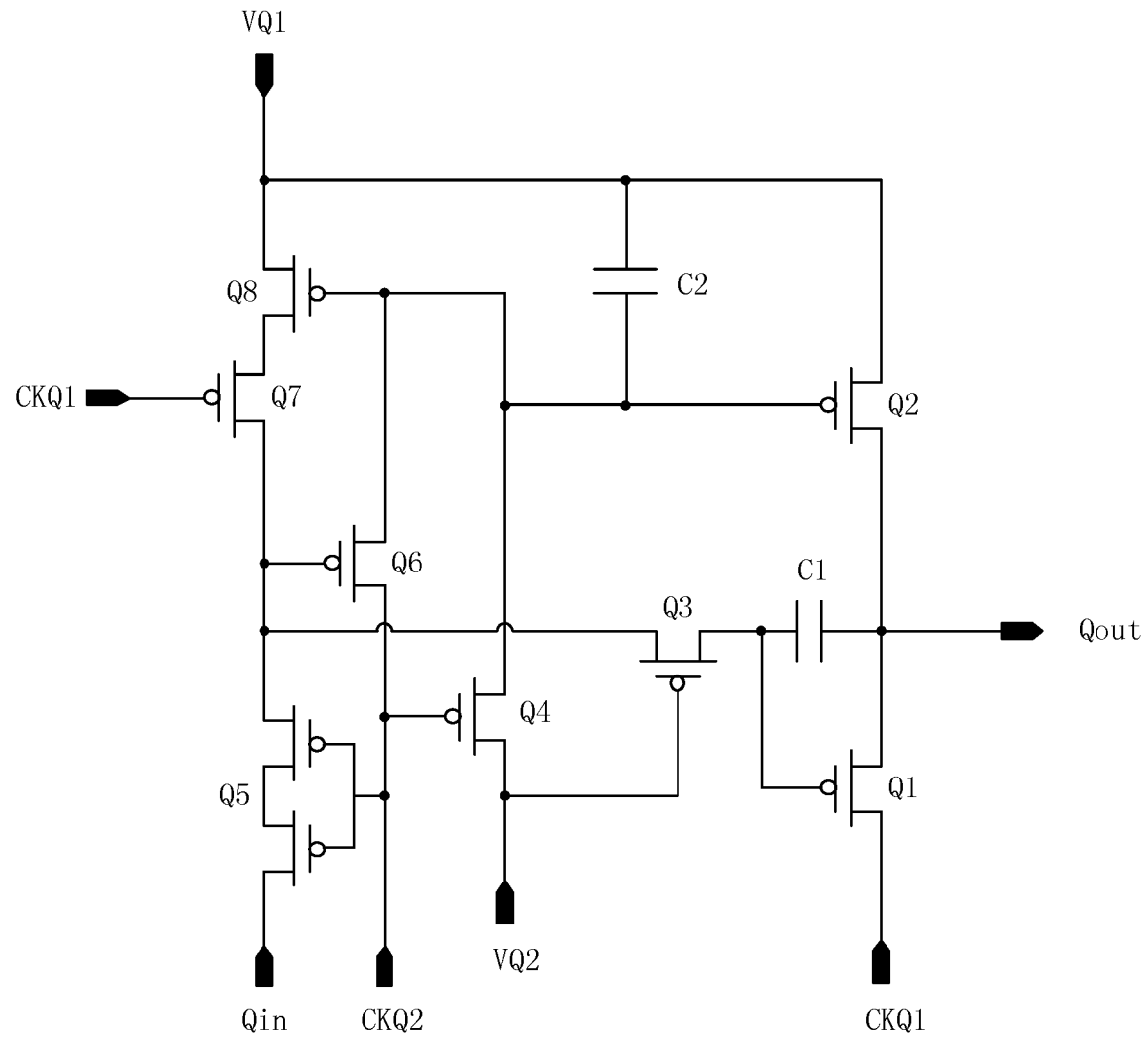
FIG. 5 is a circuit diagram of a gate driving unit of a display panel according to an embodiment of the present disclosure.
Figure 6:
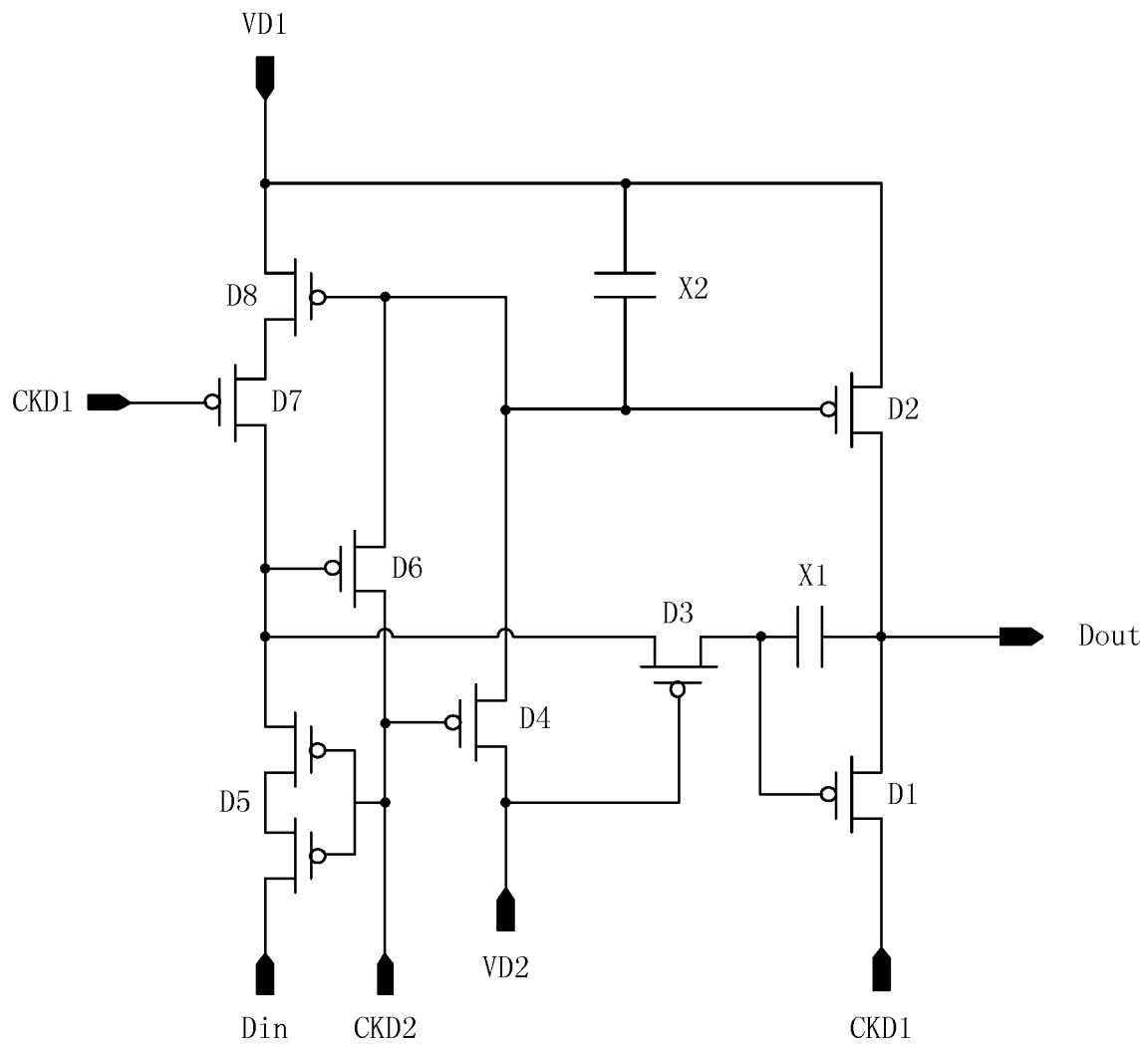
FIG. 6 is a circuit diagram of a virtual driving unit of a display panel according to an embodiment of the present disclosure.

An embodiment of the present disclosure further provides a display panel. With reference to FIG. 5 and FIG. 6, the gate driving unit S includes a plurality of gate driving transistors Q1 to Q8, and the virtual driving unit D includes a plurality of virtual driving transistors D1 to D8. The number (eight) of gate driving transistors in the gate driving unit S is equal to the number (eight) of virtual driving transistors in the virtual driving unit D. It should be noted that FIG. 5 and FIG. 6 merely illustrate one circuit design of a gate driving unit and a virtual driving unit. In other embodiments of the present disclosure, it is also possible that the gate driving unit includes seven, nine, ten, or other number of gate driving transistors, as long as the number of virtual driving transistors in the virtual driving unit is equal to the number of gate driving transistors in the gate driving unit.

According to the display panel provided by this embodiment of the present disclosure, since the number of virtual driving transistors of the virtual driving unit D is equal to the number of gate driving transistors of the gate driving unit S, the virtual driving unit D can be designed to be consistent with the gate driving unit S to a maximum extent, i.e., the circuit designs of the two can be basically the same. This can achieve design uniformity for per unit area in the rounded angle region and per unit area in the non-rounded angle region, and thus the problem of uneven etching can be solved and the encapsulation reliability of the yield of the display panel can be improved.

Figure 7:
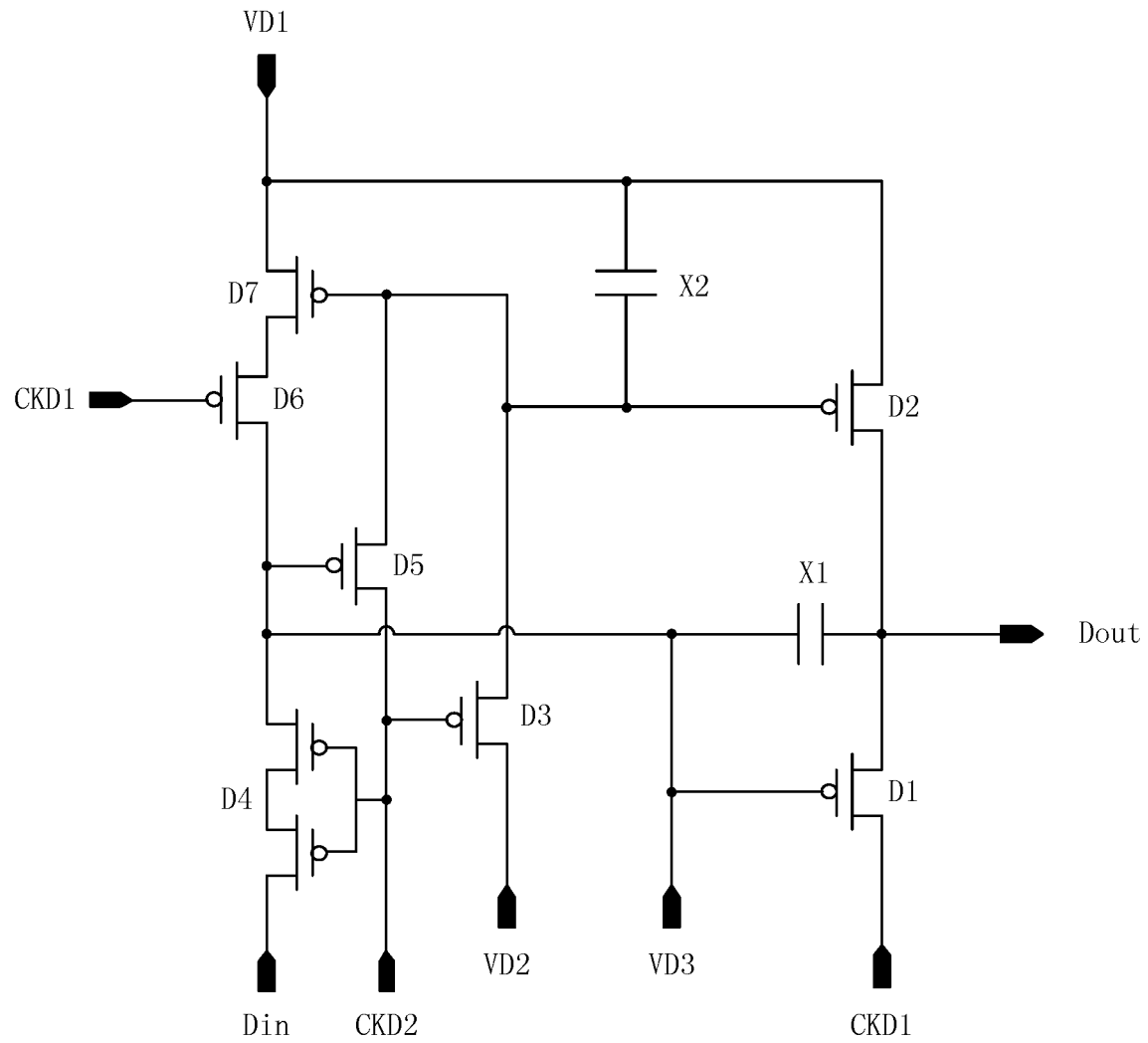
FIG. 7 is a circuit diagram of a virtual driving unit of another display panel according to an embodiment of the present disclosure.
Figure 8:
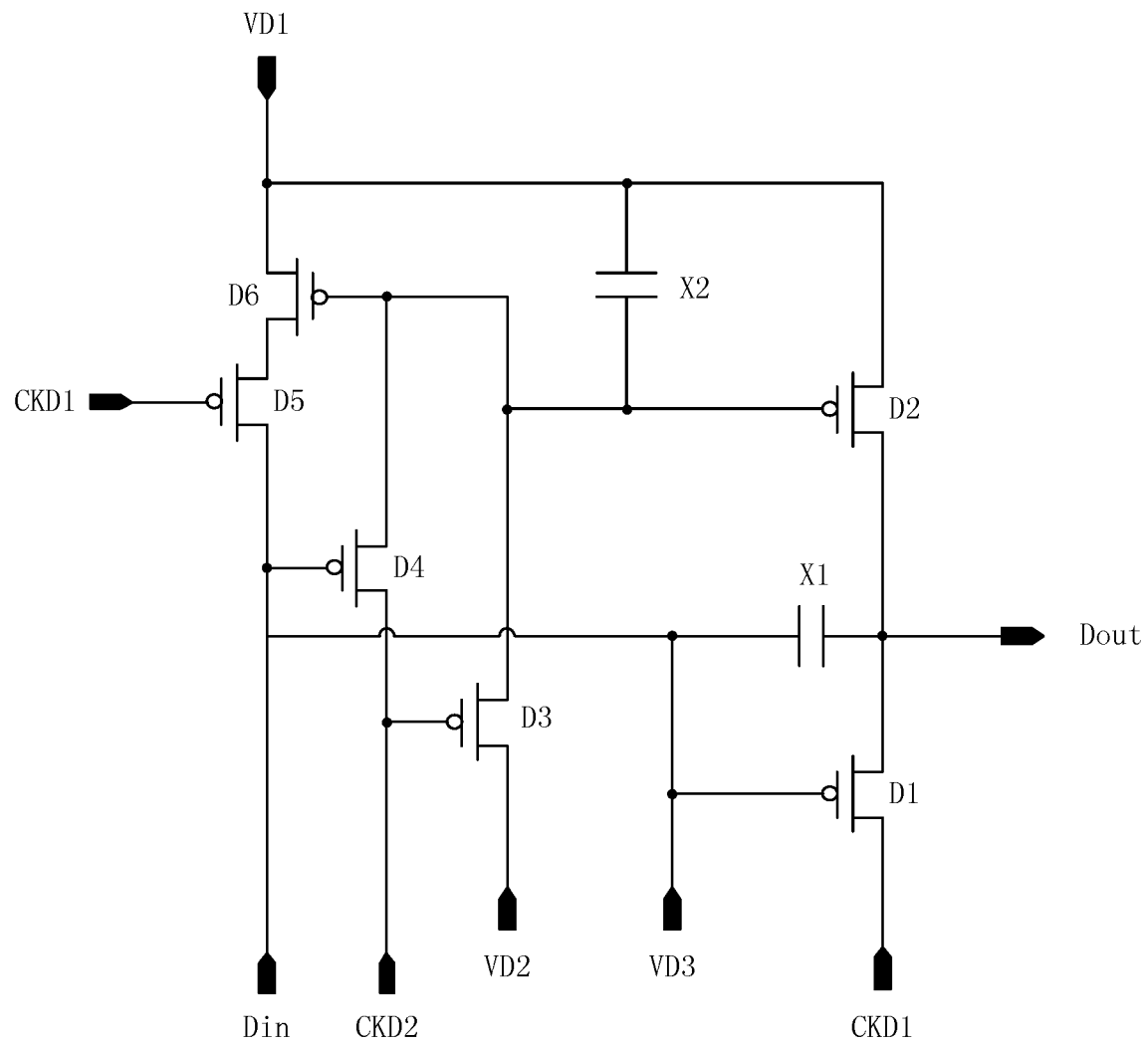
FIG. 8 is a circuit diagram of a virtual driving unit of still another display panel according to an embodiment of the present disclosure.

An embodiment of the present disclosure further provides a display panel, as shown in FIG. 5 and FIG. 7, or FIG. 5 and FIG. 8. As shown in FIG. 5 and FIG. 7, the gate driving unit S includes a plurality of gate driving transistors Q1 to Q8, and the virtual driving unit D includes a plurality of virtual driving transistors D1 to D7. The number (eight) of gate driving transistors in one gate driving unit S is larger than the number (seven) of virtual driving transistors in one virtual driving unit D. As shown in FIG. 5 and FIG. 8, the gate driving unit S includes a plurality of gate driving transistors Q1 to Q8, and the virtual driving unit D includes a plurality of virtual driving transistors D1 to D6. The number (eight) of gate driving transistors in one gate driving unit S is larger than the number (six) of virtual driving transistors in one virtual driving unit D. It should be noted that FIG. 5 merely illustrates one circuit design of the gate driving unit. In other embodiments of the present disclosure, it is also possible that the gate driving unit includes seven, nine, ten, or other number of gate driving transistors, as long as the number of virtual driving transistors in the virtual driving unit is smaller than the number of gate driving transistors in the gate driving unit.

According to the display panel provided by this embodiment of the present disclosure, since the number of virtual driving transistors in the virtual driving unit D is slightly smaller than the number of gate driving transistors in the gate driving unit S, the transistor close to the signal line can be removed while maintaining the similarity between the virtual driving unit D and the gate driving unit S, i.e., maintaining the similarity between circuit designs. In this way, the circuit load and interference can be reduced. The display panel provided by this embodiment of the present disclosure can not only maintain the similarity of design per unit area between the rounded angle region and the non-rounded angle region, solve the problem of uneven etching and improve the encapsulation reliability of the display panel, but also reduce the energy consumption and interference of the display panel, improve the yield of the display panel and improve the user experience.

One or more circuit designs, i.e., layout schemes, according to the embodiments of the present disclosure will be described as follows in details.

An embodiment of the present disclosure further provides a display panel 100. As shown in FIG. 2, FIG. 5 and FIG. 6, the display panel 100 includes a gate driving unit S and a virtual driving unit D. The gate driving unit S includes a first gate driving transistor Q1, a second gate driving transistor Q2, a third gate driving transistor Q3, a fourth gate driving transistor Q4, a fifth gate driving transistor Q5, a sixth gate driving transistor Q6, a seventh gate driving transistor Q7, an eighth gate driving transistor Q8, a first gate driving capacitor C1, and a second gate driving capacitor C2.

With further reference to FIG. 2, FIG. 5 and FIG. 6, the gate driving unit S further includes a first power signal input terminal VQ1, a second power signal input terminal VQ2, and a gate signal input terminal Qin.

The first gate driving transistor Q1 has a gate electrode electrically connected to a first plate of the first gate driving capacitor C1, a first electrode electrically connected to the first clock signal input terminal CKQ1 of the gate driving unit, and a second electrode electrically connected to a second plate of the first gate driving capacitor C1 and the output terminal Qout of the gate driving unit S.

The second gate driving transistor Q2 has a gate electrode electrically connected to a first plate of the second gate driving capacitor C2, a first electrode electrically connected to a second plate of the second gate driving capacitor C2 and the first power signal input terminal VQ1 of the gate driving of the unit S, and a second electrode electrically connected to the second electrode of the first gate driving transistor Q1.

The third gate driving transistor Q3 has a gate electrode electrically connected to the second power signal input terminal VQ2 of the gate driving transistor S, a first electrode electrically connected to a second electrode of the fifth gate driving transistor Q5, and a second electrode electrically connected to the first plate of the first gate driving capacitor C1.

The fourth gate driving transistor Q4 has a gate electrode electrically connected to the second clock signal input terminal CKQ2 of the gate driving unit S, a first electrode electrically connected to the second power signal input terminal VQ2 of the gate driving unit S, and a second electrode electrically coupled to the first plate of the second gate driving capacitor C2.

The fifth gate driving transistor Q5 has a gate electrode electrically connected to the second clock signal input terminal CKQ2 of the gate driving unit S and a first electrode electrically connected to the gate signal input terminal Qout of the gate driving unit S.

The sixth gate driving transistor Q6 has a gate electrode electrically connected to the second electrode of the fifth gate driving transistor Q5, a first electrode electrically connected to the gate electrode of the fifth gate driving transistor Q5, and a second electrode electrically connected to the first plate of the second gate driving capacitor C2.

The seventh gate driving transistor Q7 has a gate electrode electrically connected to the first clock signal input terminal CKQ1 of the gate driving unit S, a first electrode electrically connected to the second electrode of the fifth gate driving transistor Q5, and a second electrode electrically connected to a second electrode of the eighth gate driving transistor Q8.

The eighth gate driving transistor Q8 has a gate electrode electrically connected to the first plate of the second gate driving capacitor C2 and a first electrode electrically connected to the first power signal input terminal VQ1 of the gate driving unit S.

In an embodiment, the fifth gate driving transistor Q5 has a first gate electrode and a second gate electrode. In other words, the fifth gate driving transistor Q5 has a double-gate structure, that is, the fifth gate driving transistor Q5 has two gate electrodes.

Figure 13:
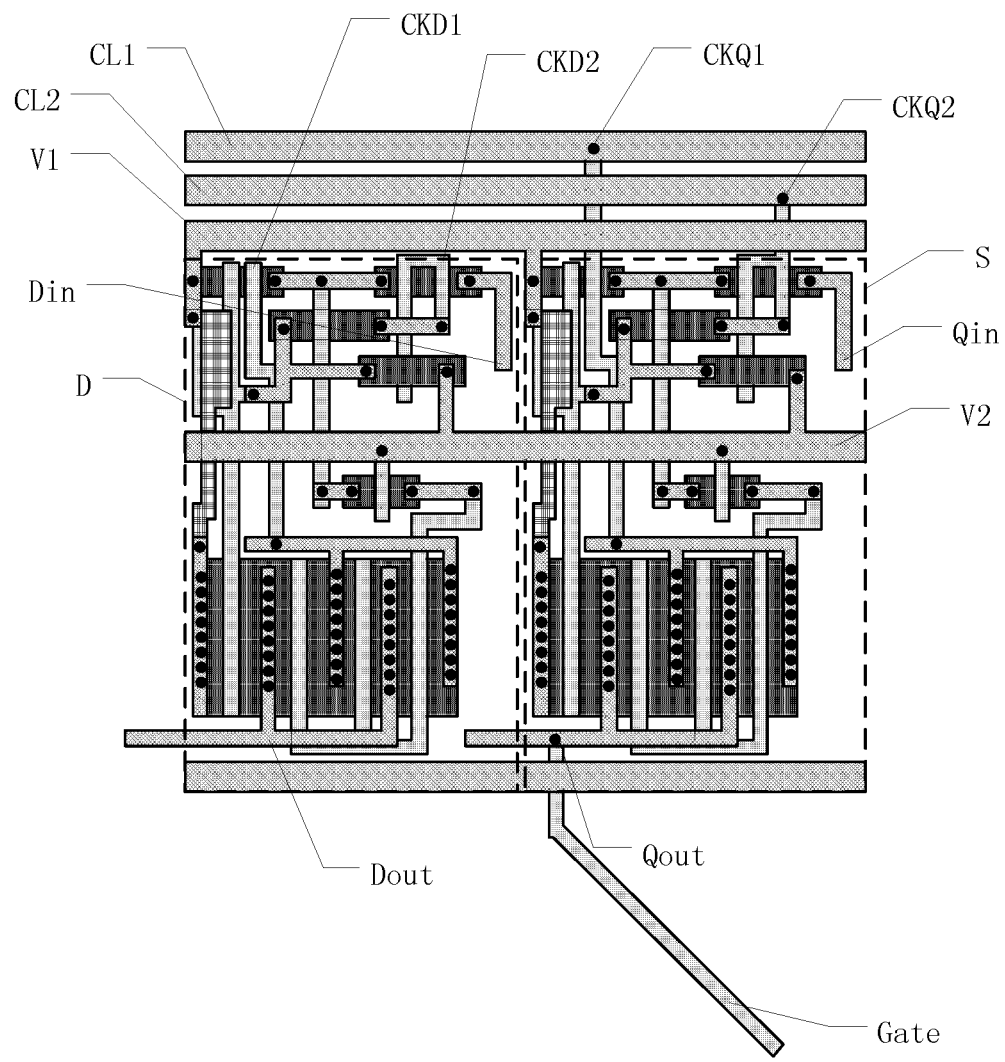
FIG. 13 is a wiring diagram of gate driving units and virtual driving units of a display panel according to an embodiment of the present disclosure.

Further, please refer to FIG. 5, FIG. 7, and FIG. 13. Herein, FIG. 13 illustrates a wiring manner of a gate driving unit S and a virtual driving unit D. As shown in FIG. 5, FIG. 7, and FIG. 13, the first power signal input terminal VQ1 of the gate driving unit S is electrically connected to the first power signal line V1, and the second power signal input terminal VQ2 of the gate driving unit S is electrically connected to the second power signal line V2. The first power signal line V1 is connected to a high-level voltage, and the first power signal line V1, the first clock signal line CL1 and the second clock signal line CL2 are arranged on a same side of the gate driving unit S. The second power signal line V2 is connected to a low-level voltage and passes through the inside of the gate driving unit S. The semiconductor layer, the gate electrodes, and the first electrodes (the second electrodes) of the gate driving transistors Q1 to Q8 are stacked sequentially. The first clock signal line CL1, the second clock signal line CL2, the first power signal line V1 and the second power signal line V2 are all disposed in a same layer as the first and second electrodes of the gate driving transistors Q1 to Q8. It should be noted that the wiring manner and the layer relationship between signal lines shown in FIG. 13 are only an exemplary embodiment of the present disclosure, and in other embodiments of the present disclosure, the wiring manner of the gate driving unit S and layout of signal lines can be different.

With further reference to FIG. 2, FIG. 5 and FIG. 6 and FIG. 13, the virtual driving unit D includes a first virtual driving transistor D1, a second virtual driving transistor D2, a third virtual driving transistor D3, a fourth virtual driving transistor D4, a fifth virtual driving transistor D5, a sixth virtual driving transistor D6, a seventh virtual driving transistor D7, an eighth virtual driving transistor D8, a first virtual driving capacitor X1, and a second virtual driving capacitor X2.

The virtual driving unit D further includes a first power signal input terminal VD1, a second power signal input terminal VD2, and a virtual signal input terminal Din.

The first virtual driving transistor D1 has a gate electrode electrically connected to a first plate of the first virtual driving capacitor X1, a first electrode electrically connected to the first clock signal input terminal CKD1 of the virtual driving unit D, and a second electrode electrically connected to a second plate of the first virtual driving capacitor X1 and insulated from the gate line Gate.

The second virtual driving transistor D2 has a gate electrode electrically connected to a first plate of the second virtual driving capacitor X2, a first electrode electrically connected to a second plate of the second virtual driving capacitor X2 and the first power signal input terminal VD1 of the virtual driving unit D, and a second electrode electrically connected to the second electrode of the first virtual driving transistor D1.

The third virtual driving transistor D3 has a gate electrode electrically connected to the second power signal input terminal VD2 of the virtual driving unit D, a first electrode electrically connected to a second electrode of the fifth virtual driving transistor D5, and a second electrode electrically connected to the first plate of the first virtual driving capacitor X1.

The fourth virtual driving transistor D4 has a gate electrode electrically connected to the second clock signal input terminal CKD2 of the virtual driving unit D, a first electrode connected to the second power signal input terminal VD2 of the virtual driving unit D, and a second electrode electrically connected to the first plate of the second gate driving capacitor X2.

The fifth virtual driving transistor D5 has a gate electrode electrically connected to the clock signal input terminal CKD2 of the virtual driving unit D and a first electrode electrically connected to the virtual signal input terminal Din of the virtual driving unit D.

The sixth virtual driving transistor D6 has a gate electrode electrically connected to the second electrode of the fifth virtual driving transistor D5, a first electrode electrically connected to the gate electrode of the fifth virtual driving transistor D5, and a second electrode electrically connected to the first plate of the second virtual driving capacitor X2.

The seventh virtual driving transistor D7 has a gate electrode electrically connected to the first clock signal input terminal CKD1 of the virtual driving unit D, a first electrode electrically connected to the second electrode of the fifth virtual driving transistor D5, and a second electrode electrically connected to a second electrode of the eighth virtual driving transistor D8.

The eighth virtual driving transistor D8 has a gate electrode electrically connected to the first plate of the second virtual driving capacitor X2 and a first electrode electrically connected to the first power signal input terminal VD1 of the virtual driving unit D.

Figure 14:
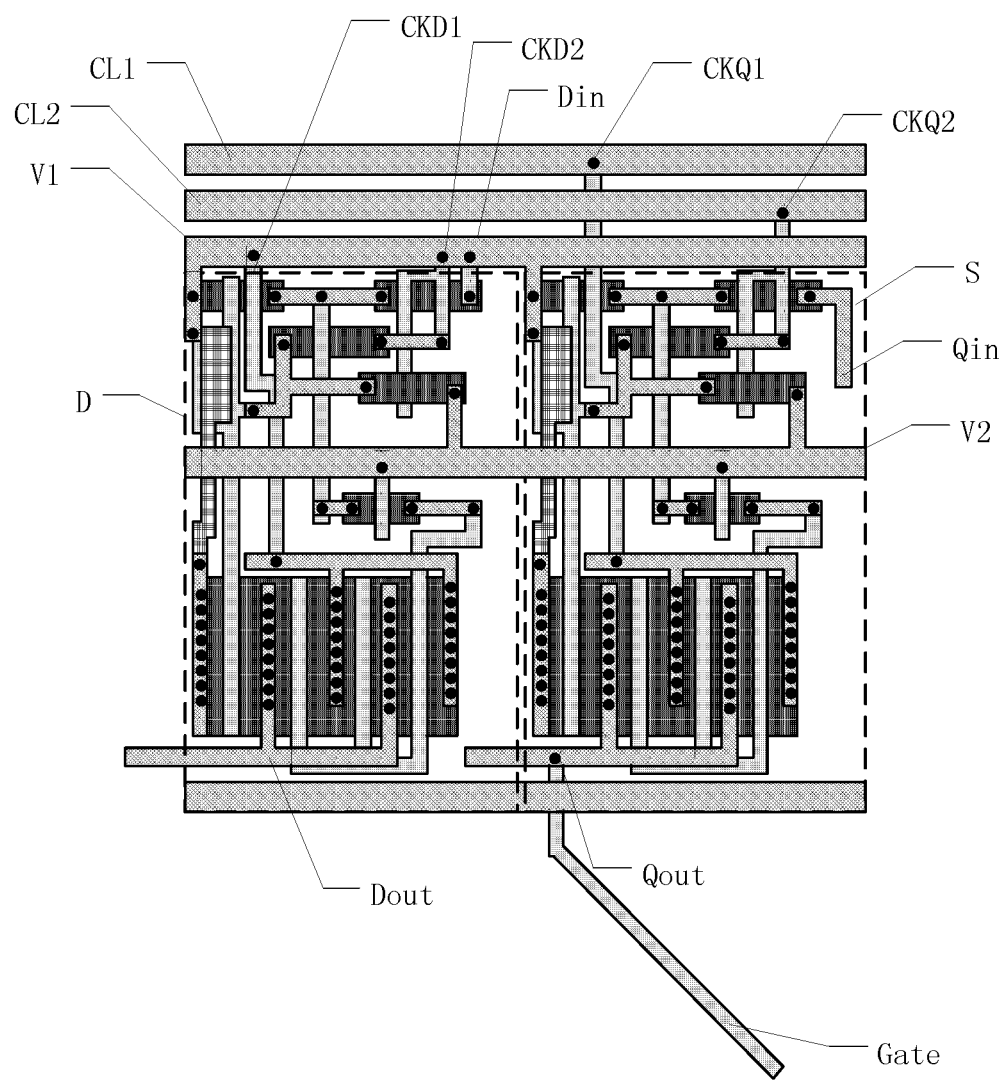
FIG. 14 is a wiring diagram of gate driving units and virtual driving units of another display panel according to an embodiment of the present disclosure.
Figure 15:
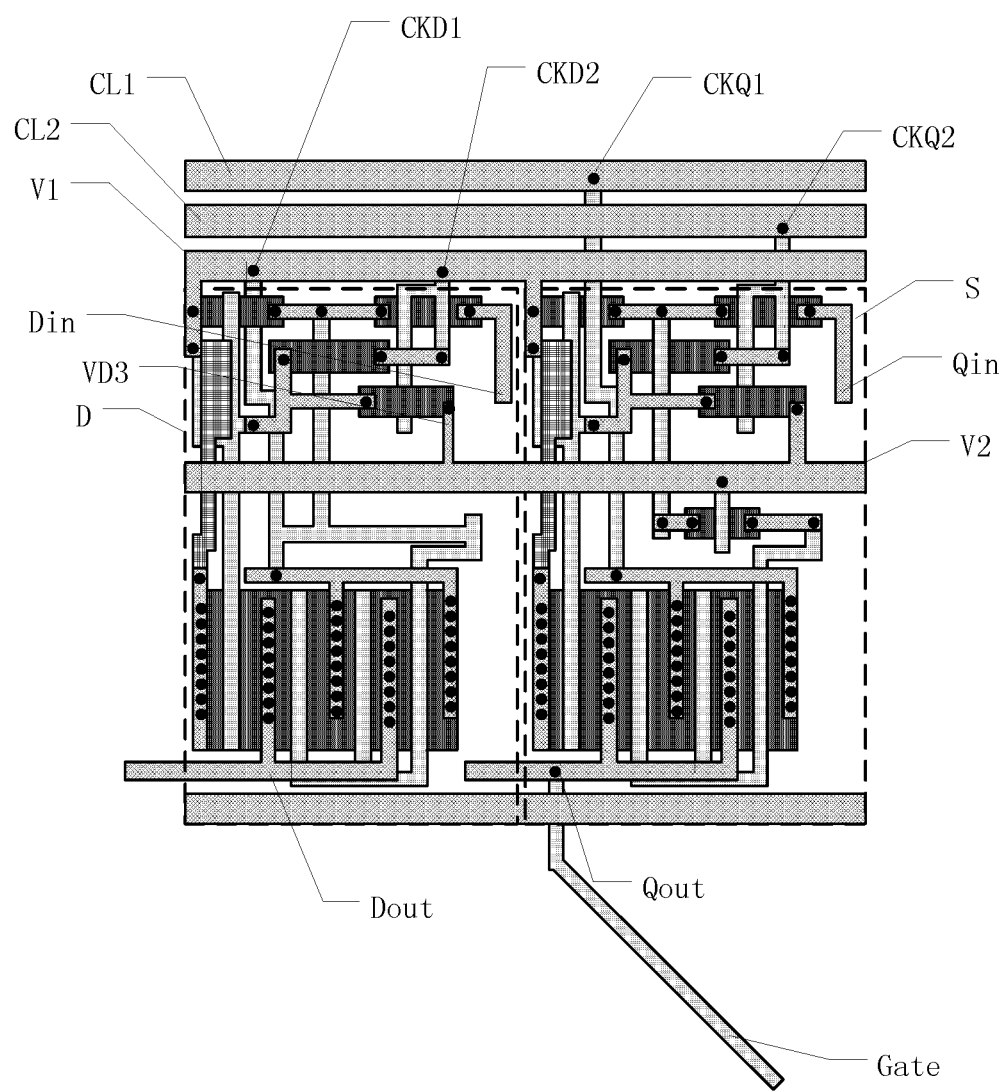
FIG. 15 is a wiring diagram of gate driving units and virtual driving units of still another display panel according to an embodiment of the present disclosure.
Figure 16:
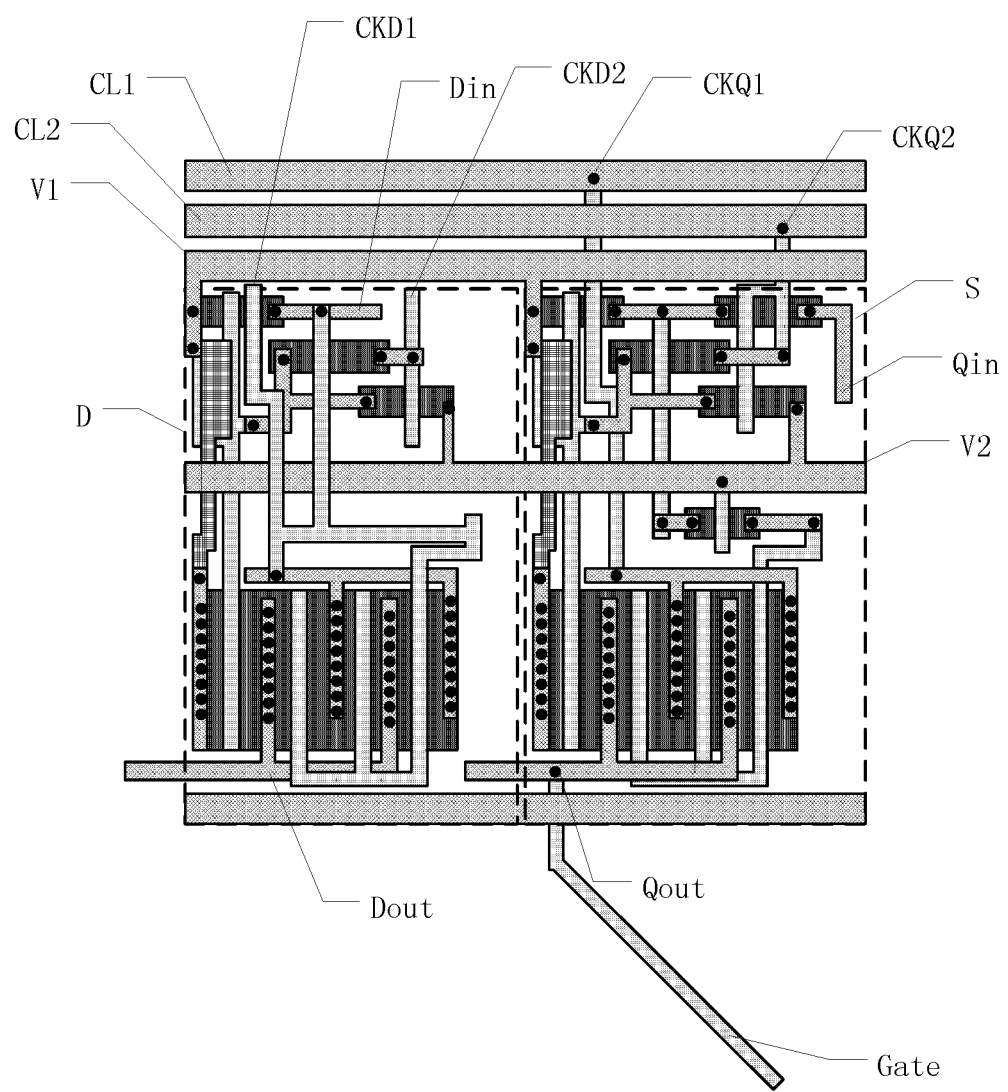
FIG. 16 is a wiring diagram of gate driving units and virtual driving units of yet another display panel according to an embodiment of the present disclosure.

Referring to FIG. 2, FIG. 5, FIG. 6 and FIG. 13, which shows a wiring manner of the virtual driving unit D shown in FIG. 6, the first clock signal input terminal CKD1, the second clock signal input terminal CKD2 and the virtual signal input terminal Din of the virtual driving unit D are all floating. It should be noted that FIG. 13 merely shows an exemplary wiring manner and connection manner of the virtual driving unit D, and in other embodiments of the present disclosure, the virtual driving unit D can also adopt other wiring manners or connection manners. As shown in FIG. 14, the first clock signal input terminal CKD1, the second clock signal input terminal CKD2 and the virtual signal input terminal Din of the virtual driving unit D are all electrically connected to the first power signal line V1.

For the display panel 100 provided by this embodiment of the present disclosure, the gate driving unit S and the virtual driving unit D have a same number of transistors and a same circuit design, so that the arrangement of the internal devices in the gate driving unit S and the arrangement of the internal devices in the virtual driving unit D have high consistency. This can fill space between adjacent gate driving units S while maintaining the etching uniformity, thereby improving the encapsulation effect and yield of the display panel 100.

As shown in FIG. 2, FIG. 5 and FIG. 7, an embodiment of the present disclosure further provides a display panel 100. The display panel 100 includes gate driving units S and virtual driving units D. The gate driving unit S includes eight gate driving transistors, and the circuit design is the same as the design of the gate driving unit S described above, which will not be further described herein. The number of the virtual driving transistors of the virtual driving unit D is one less than the number of the gate driving transistors of the gate driving unit S. The virtual driving unit D includes a first virtual driving transistor D1, a second virtual driving transistor D2, a third virtual driving transistor D3, a fourth virtual driving transistor D4, a fifth virtual driving transistor D5, a sixth virtual driving transistor D6, a seventh virtual driving transistor D7, a first virtual driving capacitor X1, and a second virtual driving capacitor X2.

With reference to FIG. 2, FIG. 5 and FIG. 7, the virtual driving unit D further includes a first power signal input terminal VD1, a second power signal input terminal VD2, a third power signal input terminal VD3, and a virtual signal input terminal Vin.

The first virtual driving transistor D1 has a gate electrode electrically connected to the third power signal input terminal VD3 of the virtual driving unit D, a first electrode electrically connected to the first clock signal input terminal CKD1 of the virtual driving unit D, and a second electrode insulated from the gate line Gate.

The second virtual driving transistor D2 has a gate electrode electrically connected to a first plate of the second virtual driving capacitor X2, a first electrode electrically connected to a second plate of the second virtual driving capacitor X2 and the first power signal input terminal VD1 of the virtual driving unit D, and a second electrode electrically connected to the second electrode of the first virtual driving transistor D1.

The third virtual driving transistor D3 has a gate electrode electrically connected to the second clock signal input terminal CKD2 of the virtual driving unit D, a first electrode electrically connected to the second power signal input terminal VD2 of the virtual driving unit D, and a second electrode electrically connected to the first plate of the second gate driving capacitor X2.

The fourth virtual driving transistor D4 has a gate electrode electrically connected to the second clock signal input terminal CKD2 of the virtual driving unit D, a first electrode electrically connected to the virtual signal input terminal Din of the virtual driving unit D, and a second electrode electrically connected to a gate electrode of the fifth virtual driving transistor D5.

The fifth virtual driving transistor D5 has a first electrode electrically connected to the second clock signal input terminal CKD2 of the virtual driving unit D, and a second electrode electrically connected to the first plate of the second virtual driving capacitor X2.

The sixth virtual driving transistor D6 has a gate electrode electrically connected to the first clock signal input terminal CKD1 of the virtual driving unit D, a first electrode electrically connected to the second electrode of the fifth virtual driving transistor D5, and a second electrode electrically connected to a second electrode of the seventh virtual driving transistor D7.

The seventh virtual driving transistor D7 has a gate electrode electrically connected to the first plate of the second virtual driving capacitor X2, and a first electrode electrically connected to the first power signal input terminal VD1 of the virtual driving unit D.

With reference to FIG. 2, FIG. 5, FIG. 6 and FIG. 15, which shows a wiring manner of the virtual driving unit D shown in FIG. 7, the first clock signal input terminal CKD1, the second clock signal input terminal CKD2 and the virtual signal input terminal Din of the virtual driving unit D are all electrically connected to the first power signal line V1. The third power signal input terminal VD3 of the virtual driving unit is electrically connected to the second power signal line V2. In other embodiments of the present disclosure, the third power signal input terminal VD3 of the virtual driving unit may also be floating or electrically connected to the first power signal line V1. It should be noted that FIG. 15 merely illustrates an exemplary wiring manner and a connection manner of the virtual driving unit D. In other embodiments of the present disclosure, the first clock signal input terminal CKD1, the second clock signal input terminal CKD2, and the virtual signal input terminal Din of the virtual driving unit D may also be floating.

For the display panel 100 provided by this embodiment of the present disclosure, the number of the transistors of the virtual driving unit D is only one less than the number of the transistors of the gate driving unit S (the virtual driving unit D does not include a third gate driving transistor Q3 existing in the gate driving unit S), so that the arrangement of the internal devices in the virtual driving unit D and the arrangement of the internal devices in the gate driving unit S have high consistency. The third gate driving transistor Q3 closest to the second power signal line V2 existing in the gate driving unit S is removed from the virtual driving unit D, so that the coupling effect with the second power signal line V2 can be reduced, thereby further improving the stability of the panel and reducing the power consumption of the panel. In addition, if the first clock signal input terminal CKD1, the second clock signal input terminal CKD2, and the virtual signal input terminal Din of the virtual driving unit D are connected to a fixed signal (i.e., being electrically connected to the first power signal line or the second power signal line), the electrostatic discharge path of the display panel 100 is increased, thereby further improving the reliability of the display panel 100. If the first clock signal input terminal CKD1, the second clock signal input terminal CKD2, and the virtual signal input terminal Din of the virtual driving unit D are floating, the panel design can be simplified and the panel complexity can be reduced.

As shown in FIG. 2, FIG. 5 and FIG. 8, an embodiment of the present disclosure further provides a display panel 100. The display panel 100 includes gate driving units S and virtual driving units D. The gate driving unit S includes eight gate driving transistors, and the circuit design is the same as the design of the gate driving unit S described above, which will not be further described herein. The number of the virtual driving transistors of the virtual driving unit D is two less than number of the gate driving transistors of the gate driving unit S. The virtual driving unit D includes a first virtual driving transistor D1, a second virtual driving transistor D2, a third virtual driving transistor D3, a fourth virtual driving transistor D4, a fifth virtual driving transistor D5, a sixth virtual driving transistor D6, a first virtual driving capacitor X1, and a second virtual driving capacitor X2.

With reference to FIG. 2, FIG. 5 and FIG. 8, the virtual driving unit D further includes a first power signal input terminal VD1, a second power signal input terminal VD2, a third power signal input terminal VD3, and a virtual signal input terminal Vin.

The first virtual driving transistor D1 has a gate electrode electrically connected to a first plate of the first virtual driving capacitor X1, a first electrode electrically connected to the first clock signal input terminal CKD1 of the virtual driving unit D, and a second electrode electrically connected to a second plate of the first virtual driving capacitor X2 and insulated from the gate line Gate.

The second virtual driving transistor D2 has a gate electrode electrically connected to a first plate of the second virtual driving capacitor X2, a first electrode electrically connected to the second plate of the second virtual driving capacitor X2 and the first power signal input terminal VD1 of the virtual driving unit D, and a second electrode electrically connected to the second electrode of the first virtual driving transistor D1.

The third virtual driving transistor D3 has a gate electrode electrically connected to the second clock signal input terminal CKD2 of the virtual driving unit D, a first electrode electrically connected to the second power signal input terminal VD2 of the virtual driving unit D, and a second electrode electrically connected to the first plate of the second virtual driving capacitor X2.

The fourth virtual driving transistor D4 has a gate electrode electrically connected to the virtual signal input terminal Din of the virtual driving unit D, a first electrode electrically connected to the second clock signal input terminal CKD2 of the virtual driving unit D, and a second electrode electrically connected to the first plate of the second virtual driving capacitor X2.

The fifth virtual driving transistor D5 has a gate electrode electrically connected to the first clock signal input terminal CKD1 of the virtual driving unit D, a first electrode electrically connected to the gate electrode of the fourth virtual driving transistor D4, and a second electrode electrically connected to a second electrode of the sixth virtual driving transistor D6.

The sixth virtual driving transistor D6 has a gate electrode electrically connected to the first plate of the second virtual driving capacitor X2, and a first electrode electrically connected to the first power signal input terminal VD1 of the virtual driving unit D.

Referring to FIG. 2, FIG. 5, FIG. 6 and FIG. 15, which illustrates a wiring manner of the virtual driving unit D shown in FIG. 7, the first clock signal input terminal CKD1, the second clock signal input terminal CKD2, and the virtual signal input terminal Din of the virtual driving unit D are all floating. The third power signal input terminal VD3 of the virtual driving unit is electrically connected to the second power signal line V2. It should be noted that in other embodiments of the present disclosure, the third power signal input terminal VD3 of the virtual driving unit may also be floating or electrically connected to the first power signal line V1. It should be noted that FIG. 15 merely illustrates an exemplary wiring manner and connection manner of the virtual driving unit D. In other embodiments of the present disclosure, the first clock signal input terminal CKD1, the second clock signal input terminal CKD2, and the virtual signal input terminal Din of the virtual driving unit D may also be electrically connected to the first power signal line V1 or the second power signal line V2.

For the display panel 100 provided by this embodiment of the present disclosure, the number of the transistors of the virtual driving unit D is only two less than the number of the transistors of the gate driving unit S (the virtual driving unit D does not include a third gate driving transistor Q3 or a fifth gate driving transistor Q5 existing in the gate driving unit S), so that the arrangement of the internal devices in the virtual driving unit D and the arrangement of the internal devices in the gate driving unit S have high consistency. The third gate driving transistor Q3 closest to the second power signal line V2 in the gate driving unit S is removed from the virtual driving unit D, and the fifth gate driving transistor Q5 closest to the first power signal line V1 in the gate driving unit S and having a dual-gate structure is removed from the virtual driving unit D. In this way, the coupling effect of the transistor with the second power signal line V2 and the coupling effect of the transistor with the first power signal line V1 can be reduced, thereby further improving the stability of the panel and reducing the power consumption of the panel. In addition, if the first clock signal input terminal CKD1, the second clock signal input terminal CKD2, and the virtual signal input terminal Din of the virtual driving unit D are connected to a fixed signal (i.e., being electrically connected to the first power signal line or the second power signal line), the electrostatic discharge path of the display panel 100 is increased, thereby further improving the reliability of the display panel 100. If the first clock signal input terminal CKD1, the second clock signal input terminal CKD2, and the virtual signal input terminal Din of the virtual driving unit D are floating, the panel design can be simplified and the panel complexity can be reduced.

Figure 9:
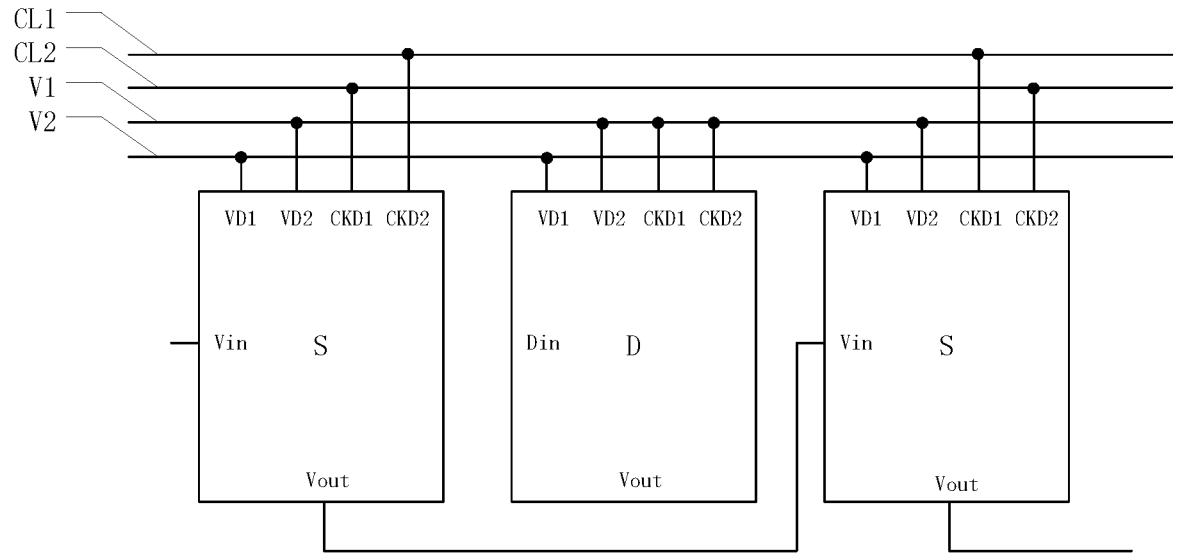
FIG. 9 is a schematic diagram illustrating an arrangement and connections of gate driving units and virtual driving units of still another display panel according to an embodiment of the present disclosure.

An embodiment of the present disclosure further provides a display panel 100. As shown in FIG. 9, the first clock signal input terminal CKD1 of the virtual driving unit D and the second clock signal input terminal CKD2 of the virtual driving unit D are electrically connected to the first power signal line V1. The first power signal input terminal VD1 of the virtual driving unit S is electrically connected to the second power signal line V2, and the second power signal input terminal VD2 of the virtual driving unit D is electrically connected to the first power signal line V1. The virtual driving unit D may be designed as a circuit shown in FIG. 6, FIG. 7, FIG. 8, or any other circuit.

Figure 10:
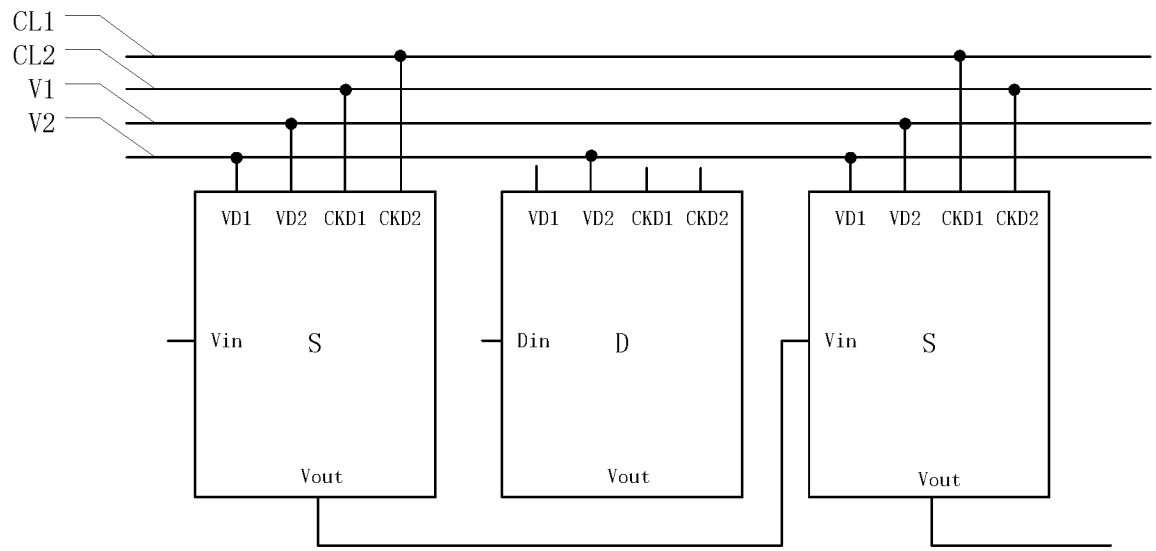
FIG. 10 is a schematic diagram illustrating an arrangement and connections of gate driving units and virtual driving units of yet another display panel according to an embodiment of the present disclosure.

In an embodiment, as shown in FIG. 10, the first clock signal input terminal CKD1, the second clock signal input terminal CKD2, and the first power signal input terminal VD1 of the virtual driving unit D are all floating. The second power signal input terminal VD2 of the virtual driving unit is electrically connected to the second power signal line V2. The virtual driving unit D can be designed as a circuit shown in FIG. 6, FIG. 7, FIG. 8, or any other circuit.

Figure 11:
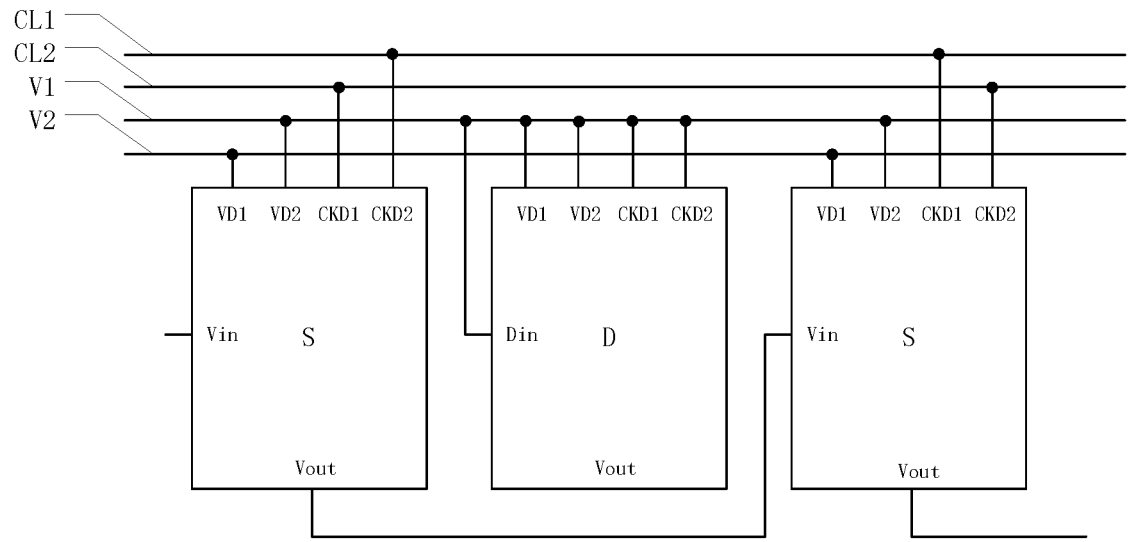
FIG. 11 is a schematic diagram illustrating an arrangement and connections of gate driving units and virtual driving units of yet another display panel according to an embodiment of the present disclosure.

In an embodiment, as shown in FIG. 11, the first clock signal input terminal CKD1, the second clock signal input terminal CKD2, the first power signal input terminal VD1, and the second power signal input terminal VD2 of the virtual driving unit D are all electrically connected to the first power signal line V1. The virtual driving unit D can be designed as a circuit shown in FIG. 6, FIG. 7, FIG. 8, or any other circuit.

Figure 12:
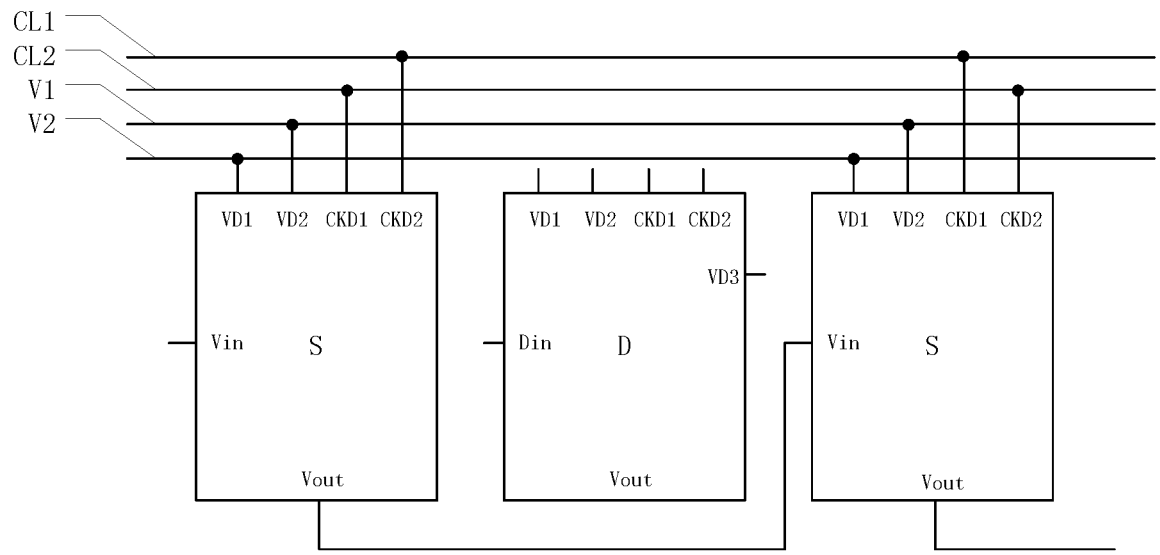
FIG. 12 is a schematic diagram illustrating an arrangement and connections of gate driving units and virtual driving units of yet another display panel according to an embodiment of the present disclosure.

In an embodiment, as shown in FIG. 12, the first clock signal input terminal CKD1, the second clock signal input terminal CKD2, the first power signal input terminal VD1, the second power signal input terminal VD2, and the third power signal input terminal VD3 of the virtual driving unit D are all floating. The virtual driving unit D can be designed as a circuit shown in FIG. 7, FIG. 8, or any other circuit.

Figure 17:
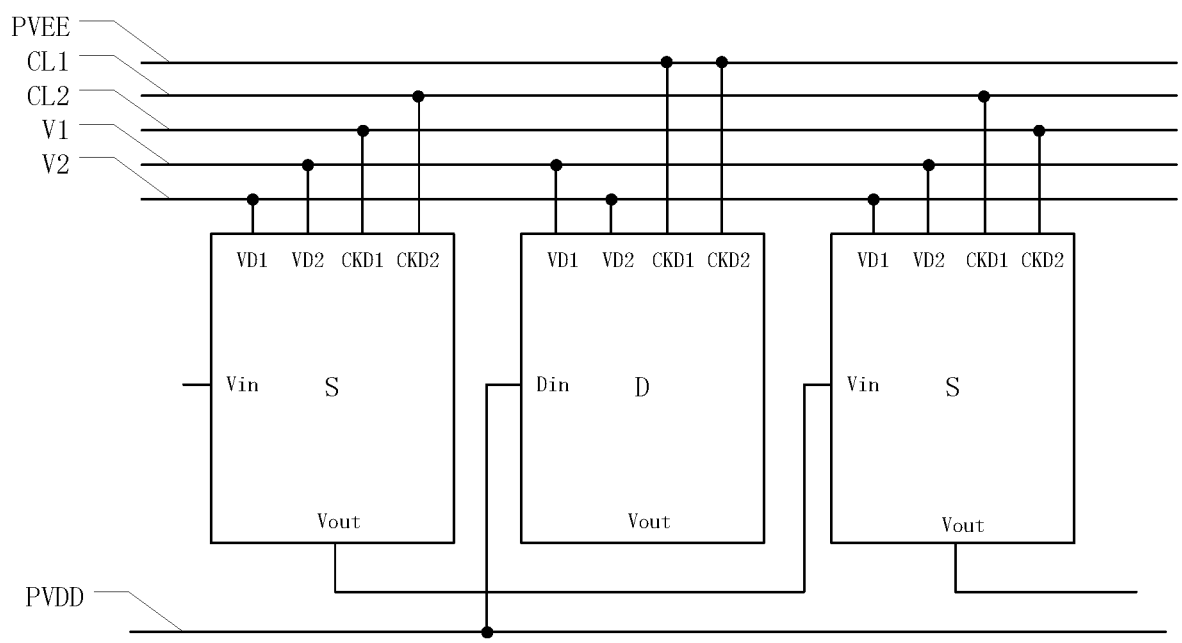
FIG. 17 is a schematic diagram illustrating an arrangement and connections of gate driving units and virtual driving units of yet another display panel according to an embodiment of the present disclosure.

In an embodiment, as shown in FIG. 17, the display panel 100 includes an anode signal input line PVDD and a cathode signal input line PVEE. The anode signal input line PVDD and the cathode signal input line PVEE may be respectively located on two sides of the virtual driving unit D. The first clock signal input terminal CKD1 of the virtual driving unit D is electrically connected to the cathode signal input line PVEE. The second clock signal input terminal CKD2 of the virtual driving unit D is electrically connected to the cathode signal input line PVEE. The virtual signal input terminal Din of the virtual driving unit D is electrically connected to the anode signal input line PVDD.

It should be noted that, in other embodiments of the present disclosure, the first clock signal input terminal CKD1 of the virtual driving unit D may be floating or electrically connected to any one of the anode signal input line PVDD, the cathode signal input line PVEE, the first power signal line V1, and the second power signal line V2.

The second clock signal input terminal CKD2 of the virtual driving unit D may be floating or electrically connected to any one of the anode signal input line PVDD, the cathode signal input line PVEE, the first power signal line V1, and the second power signal line V2.

Figure 18:
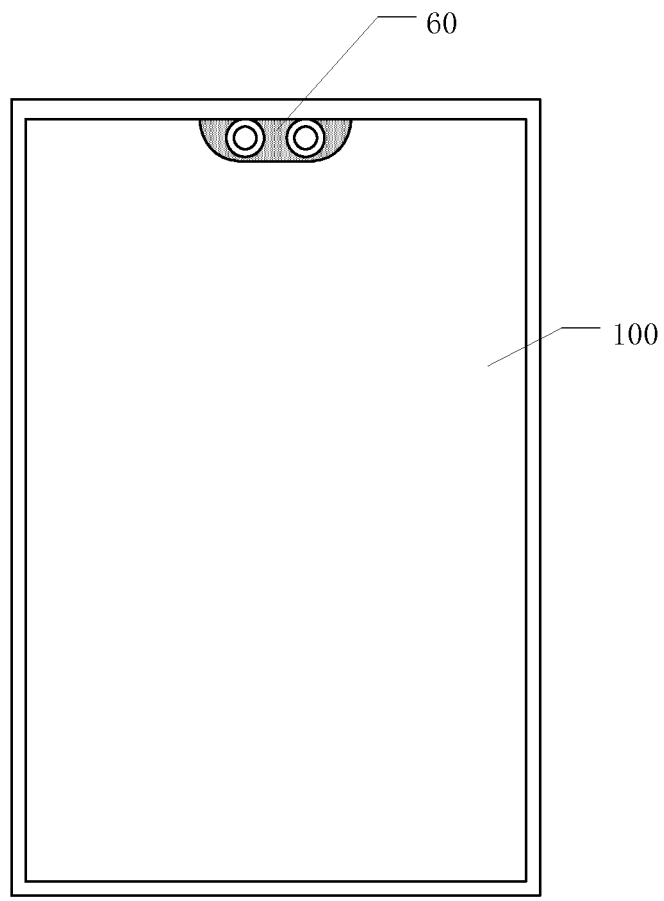
FIG. 18 is a top view of a display device according to an embodiment of the present disclosure.

As shown in FIG. 18, an embodiment of the present disclosure further provides a display device 500 including the display panel 100 provided by this embodiment of the present disclosure. The display panel 100 has a display region and a peripheral region, and the peripheral region includes a rounded angle region. With further reference to FIG. 18, the display device 500 further includes an image capture device 60 or a sounding device 60. The image capture device 60 can be a device such as a camera, an image picker, or the like that can perform photographing, camera shooting, image capturing, or recognizing. The sounding device 60 can also be a device that can emit sound by vibration, such as an earpiece, a sounder, or the like.

For the display device 500 provided by this embodiment of the present disclosure, at least one virtual driving unit D is arranged between the gate driving units S in the rounded angle region, such that a position without the gate driving unit S in the rounded angle region is filled, and thus the problem of uneven etching in the rounded angle region can be solved and he reliability and yield of the display device 500 can be improved.

It should be noted that FIG. 18 is merely an example of the display device 500, and the shape of the display device 500 is not limited to the shape or usage state shown in FIG. 18. The display device 500 may be rectangular or non-rectangular. The display device 500 may have no border at all or may have at least one border.

The device embodiments described above are merely illustrative, the units illustrated as separate components may or may not be physically separated, and the components shown as units may or may not be physical units, i.e., they may be located in one place, or may be distributed to at least two network units. Some or all of the modules may be selected according to actual needs to achieve the purpose of the solution of the embodiment. Those skilled in the art can understand and implement without paying creative efforts.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A display panel, having a display region and a peripheral region, wherein the display panel comprises:
    a plurality of gate lines;
    a plurality of data lines, the plurality of data lines being insulated from and intersecting with the plurality of gate lines;
    a plurality of pixel units;
    a first clock signal line;
    a second clock signal line;
    a first power signal line;
    a second power signal line;
    a plurality of gate driving units, wherein each of the plurality of gate driving units has an output terminal electrically connected to one of the plurality of gate lines, a first clock signal input terminal electrically connected to the first clock signal line, and a second clock signal input terminal electrically connected to the second clock signal line; and a plurality of virtual driving units, wherein each of the plurality of virtual driving units has an output terminal insulated from the plurality of gate lines, a first power signal input terminal, a second power signal input terminal, a first clock signal input terminal insulated from the first clock signal line and the second clock signal line, and a second clock signal input terminal insulated from the first clock signal line and the second clock signal line, wherein the first clock signal input terminal of each of the plurality of virtual driving units, the second clock signal input terminal of each of the plurality of virtual driving units, the first power signal input terminal of each of the plurality of virtual driving units and the second power signal input terminal of each of the plurality of virtual driving units are electrically connected to the first power signal line, and the peripheral region comprises at least one rounded angle region, and at least one of the plurality of virtual driving units is disposed within the at least one rounded angle region and located between two of the plurality of gate driving units.

2. The display panel according to claim 1, wherein each of the plurality of gate driving units has an input terminal electrically connected to the output terminal of a previous stage of gate driving unit, and each of the plurality of virtual driving units has a virtual signal input terminal electrically connected to the first power signal line.

3. The display panel according to claim 1, wherein the plurality of gate driving units is cascaded, each of the plurality of gate driving units has an input terminal electrically connected to the output terminal of a previous stage of gate driving unit, and each of the plurality of virtual driving units has a virtual signal input terminal that is floating.

4. The display panel according to claim 1, wherein each of the plurality of gate driving units comprises a plurality of gate driving transistors, and each of the plurality of virtual driving units comprises a plurality of virtual driving transistors;

a number of the plurality of gate driving transistors in each of the plurality of gate driving units is equal to a number of the plurality of virtual driving transistors in each of the plurality of virtual driving units.

5. The display panel according to claim 1, wherein each of the plurality of gate driving units comprises a plurality of gate driving transistors, and each of the plurality of virtual driving units comprises a plurality of virtual driving transistors;

a number of the plurality of gate driving transistors in each of the plurality of gate driving units is greater than a number of the plurality of virtual driving transistors in each of the plurality of virtual driving units.

6. The display panel according to claim 1, wherein each of the plurality of gate driving units comprises a first gate driving transistor, a second gate driving transistor, a third gate driving transistor, a fourth gate driving transistor, a fifth gate driving transistor, a sixth gate driving transistor, a seventh gate driving transistor, an eighth gate driving transistor, a first gate driving capacitor, and a second gate driving capacitor.

7. The display panel according to claim 6, wherein each of the plurality of gate driving units further comprises a first power signal input terminal, a second power signal input terminal, and a gate signal input terminal;

the first gate driving transistor has a gate electrode electrically connected to a first plate of the first gate driving capacitor, a first electrode electrically connected to the first clock signal input terminal of the gate driving unit, and a second plate electrically connected to a second plate of the first gate driving capacitor and an output terminal of the gate driving unit;

the second gate driving transistor has a gate electrode electrically connected to a first plate of the second gate driving capacitor, a first electrode electrically connected to a second plate of the second gate driving capacitor and the first power signal input terminal of the corresponding one gate driving unit, and a second electrode electrically connected to the second electrode of the first gate driving transistor;

the third gate driving transistor has a gate electrode electrically connected to the second power signal input terminal of the corresponding one gate driving unit, a first electrode electrically connected to a second electrode of the fifth gate driving transistor, and a second electrode electrically connected to the first plate of the first gate driving capacitor;

the fourth gate driving transistor has a gate electrode electrically connected to the second clock signal input terminal of the corresponding one gate driving unit, a first electrode electrically connected to the second power signal input terminal of the corresponding one gate driving unit, and a second electrode electrically connected to the first plate of the second gate driving capacitor;

the fifth gate driving transistor has at least one gate electrode electrically connected to the second clock signal input terminal of the corresponding one gate driving unit and a first electrode electrically connected to the gate signal input terminal of the corresponding one gate driving unit;

the sixth gate driving transistor has a gate electrode electrically connected to the second electrode of the fifth gate driving transistor, a first electrode electrically connected to the at least one gate electrode of the fifth gate driving transistor, and a second electrode electrically connected to the first plate of the second gate driving capacitor;

the seventh gate driving transistor has a gate electrode electrically connected to the first clock signal input terminal of the corresponding one gate driving unit, a first electrode electrically connected to the second electrode of the fifth gate driving transistor, and a second electrode electrically connected to a second electrode of the eighth gate driving transistor; and the eighth gate driving transistor has a gate electrode electrically connected to the first plate of the second gate driving capacitor, and a first electrode electrically connected to the first power signal input terminal of the corresponding one gate driving unit.

8. The display panel according to claim 7, wherein the at least one gate electrode of the fifth gate driving transistor comprises a first gate electrode and a second gate electrode.

9. The display panel according to claim 7, wherein the first power signal input terminal of each of the plurality of gate driving units is electrically connected to the first power signal line, and the second power signal input terminal of each of the plurality of gate driving units is electrically connected to the second power signal line.

10. The display panel according to claim 1, each of the plurality of virtual driving units comprises a first virtual driving transistor, a second virtual driving transistor, a third virtual driving transistor, a fourth virtual driving transistor, a fifth virtual driving transistor, a sixth virtual driving transistor, a seventh virtual driving transistor, an eighth virtual driving transistor, a first virtual driving capacitor, and a second virtual driving capacitor.

11. The display panel according to claim 10, wherein each of the plurality of virtual driving units further comprises a virtual signal input terminal;
the first virtual driving transistor has a gate electrode electrically connected to a first plate of the first virtual driving capacitor, a first electrode electrically connected to the first clock signal input terminal of the corresponding one virtual driving unit, and a second electrode electrically connected to a second plate of the first virtual driving capacitor and insulated from the plurality of gate lines;
the second virtual driving transistor has a gate electrode electrically connected to a first plate of the second virtual driving capacitor, a first electrode electrically connected to a second plate of the second virtual driving capacitor and the first power signal input terminal of the corresponding one virtual driving unit, and a second electrode electrically connected to the second electrode of the first virtual driving transistor;
the third virtual driving transistor has a gate electrode electrically connected to the second power signal input terminal of the corresponding one virtual driving unit, a first electrode electrically connected to a second electrode of the fifth virtual driving transistor, and a second electrode electrically connected to the first plate of the first virtual driving capacitor;
the fourth virtual driving transistor has a gate electrode electrically connected to the second clock signal input terminal of the corresponding one virtual driving unit, a first electrode electrically connected to the second power signal input terminal of the corresponding one virtual driving unit, and a second electrode electrically connected to the first plate of the second gate driving capacitor;
the fifth virtual driving transistor has a gate electrode electrically connected to the second clock signal input terminal of the corresponding one virtual driving unit, and a first electrode electrically connected to the virtual signal input terminal of the corresponding one virtual driving unit;
the sixth virtual driving transistor has a gate electrode electrically connected to the second electrode of the fifth virtual driving transistor, a first electrode electrically connected to the gate electrode of the fifth virtual driving transistor, and a second electrode electrically connected to the first plate of the second virtual driving capacitor;
the seventh virtual driving transistor has a gate electrode electrically connected to the first clock signal input terminal of the corresponding one virtual driving unit, a first electrode electrically connected to the second electrode of the fifth virtual driving transistor, and a second electrode electrically connected to a second electrode of the eighth virtual driving transistor; and
the eighth virtual driving transistor has a gate electrode electrically connected the first plate of the second virtual driving capacitor, and a first electrode electrically connected to the first power signal input terminal of the corresponding one virtual driving unit.

12. The display panel according to claim 11, further comprising an anode signal input line and a cathode signal input line;
the first clock signal input terminal of each of the plurality of virtual driving units is floating or electrically connected to any one of the anode signal input line, the cathode signal input line, the first power signal line, and the second power signal line; and
the second clock signal input terminal of each of the plurality of virtual driving units is floating or electrically connected to any one of the anode signal input line, the cathode signal input line, the first power signal line, and the second power signal line.

13. The display panel according to claim 1, wherein each of the plurality of virtual driving units comprises a first virtual driving transistor, a second virtual driving transistor, a third virtual driving transistor, a fourth virtual driving transistor, a fifth virtual driving transistor, a sixth virtual driving transistor, a seventh virtual driving transistor, a first virtual driving capacitor, and a second virtual driving capacitor.

14. The display panel according to claim 13, wherein each of the plurality of virtual driving units further comprises a third power signal input terminal, and a virtual signal input terminal;
the first virtual driving transistor has a gate electrode electrically connected to the third power signal input terminal of the corresponding one virtual driving unit, a first electrode electrically connected to the first clock signal input terminal of the corresponding one virtual driving unit, and a second electrode insulated from the plurality of gate lines;
the second virtual driving transistor has a gate electrode electrically connected to a first plate of the second virtual driving capacitor, a first electrode electrically connected to a second plate of the second virtual driving capacitor and the first power signal input terminal of the virtual driving unit, and a second electrode electrically connected to the second electrode of the first virtual driving transistor;
the third virtual driving transistor has a gate electrode electrically connected to the second clock signal input terminal of the corresponding one virtual driving unit, a first electrode electrically connected to the second power signal input terminal of the corresponding one virtual driving unit, and a second electrode electrically connected to the first plate of the second gate driving capacitor;
the fourth virtual driving transistor has a gate electrode electrically connected to the second clock signal input terminal of the corresponding one virtual driving unit, a first electrode electrically connected to the virtual signal input terminal of the corresponding one virtual driving unit, and a second electrode electrically connected to a gate electrode of the fifth virtual driving transistor;
the fifth virtual driving transistor has a first electrode electrically connected to the second clock signal input terminal of the corresponding one virtual driving unit, and a second electrode electrically connected to the first plate of the second virtual driving capacitor;
the sixth virtual driving transistor has a gate electrode electrically connected to the first clock signal input terminal of the corresponding one virtual driving unit, a first electrode electrically connected to the second electrode of the fifth virtual driving transistor, and a second electrode electrically connected to a second electrode of the seventh virtual driving transistor; and the seventh virtual driving transistor has a gate electrode electrically connected to the first plate of the second virtual driving capacitor, and a first electrode electrically connected to the first power signal input terminal of the corresponding one virtual driving unit.

15. The display panel according to claim 14, wherein the third power signal input terminal of each of the plurality of virtual driving units is floating or electrically connected to the first power signal line or the second power signal line.

16. The display panel according to claim 1, wherein each of the plurality of virtual driving units comprises a first virtual driving transistor, a second virtual driving transistor, a third virtual driving transistor, a fourth virtual driving transistor, a fifth virtual driving transistor, a sixth virtual driving transistor, a first virtual driving capacitor, and a second virtual driving capacitor.

17. The display panel according to claim 16, wherein each of the plurality of virtual driving units further comprises a third power signal input terminal and a virtual signal input terminal;

the first virtual driving transistor has a gate electrode electrically connected to a first plate of the first virtual driving capacitor, a first electrode electrically connected to the first clock signal input terminal of the corresponding one virtual driving unit, and a second electrode electrically connected to a second plate of the first virtual driving capacitor and insulated from the plurality of gate lines;

the second virtual driving transistor has a gate electrode electrically connected to a first plate of the second virtual driving capacitor, a first electrode electrically connected to a second plate of the second virtual driving capacitor and the first power signal input terminal of the corresponding one virtual driving unit, a second electrode electrically connected to the second electrode of the first virtual driving transistor;

the third virtual driving transistor has a gate electrode electrically connected to the second clock signal input terminal of the corresponding one virtual driving unit, a first electrode electrically connected to the second power signal input terminal of the corresponding one virtual driving unit, and a second electrode electrically connected to the first plate of the second virtual driving capacitor;

the fourth virtual driving transistor has a gate electrode electrically connected to the virtual signal input terminal of the corresponding one virtual driving unit, a first electrode electrically connected to the second clock signal input terminal of the corresponding one virtual driving unit, and a second electrode electrically connected to the first plate of the second virtual driving capacitor;

the fifth virtual driving transistor has a gate electrode electrically connected to the first clock signal input terminal of the corresponding one virtual driving unit, a first electrode electrically connected to the gate electrode of the fourth virtual driving transistor, and a second electrode electrically connected to a second electrode of the sixth virtual driving transistor; and the sixth virtual driving transistor has a gate electrode electrically connected to the first plate of the second virtual driving capacitor, and a first electrode electrically connected to the first power signal input terminal of the corresponding one virtual driving unit.

18. A display device, comprising the display panel according to claim 1.

* * * * *